United States Patent [19]

Nakajiri

[11] 4,312,018
[45] Jan. 19, 1982

[54] DEMODULATOR IN A FACSIMILE SYSTEM
[75] Inventor: Takashi Nakajiri, Nara, Japan
[73] Assignee: Sharp Kabushiki Kaisha, Osaka, Japan
[21] Appl. No.: 116,988
[22] Filed: Jan. 30, 1980
[30] Foreign Application Priority Data
Jan. 31, 1979 [JP] Japan .................. 54-00053
[51] Int. Cl.³ .................. H04N 1/40; H04N 7/12
[52] U.S. Cl. .................. 358/261; 340/347 DD
[58] Field of Search .................. 358/261, 260
[56] References Cited
PUBLICATIONS
Intel Systems Data Catalog, 1980, pp. 419-425.

*Primary Examiner*—Howard Britton
*Attorney, Agent, or Firm*—Birch, Stewart, Kolasch and Birch

[57] ABSTRACT

A facsimile receiver includes a demodulator system for converting a received MH code (Modified Huffman Code) signal into a signal representing actual run length information. The demodulator system comprises a demodulation table ROM for comparing the received MH code signal with MH codes stored therein. The leading "0" included in the received MH code signal is counted to provide a portion of an input data to be applied to the demodulation table ROM. When the received MH code signal relates to the terminating code and the input data to the demodulation table ROM becomes identical with one of MH codes stored in the demodulation table ROM, an output data of the demodulation table ROM is utilized without modification to obtain the actual run length information. When the received MH code signal relates to the makup code and the input data to the demodulation table ROM becomes identical with one of the MH codes stored in the demodulation table ROM, six lower bit zero's are added to the output data of the demodulation table ROM to obtain the actual run length information.

5 Claims, 2 Drawing Figures

DEMODULATOR IN A FACSIMILE SYSTEM

BACKGROUND AND SUMMARY OF THE INVENTION

The present invention relates to a demodulator system in a facsimile and, more particularly, to a demodulator system for converting a received MH code (Modified Huffman Code) signal to an RL code (Run Length Code) signal in a facsimile system.

In a facsimile system, a transmitter forms the RL code signal in accordance with the picture information read out from an original. The RL code signal is modulated, at the transmitter, to the MH code signal which is suited for the compressed transmission, and the thus obtained MH code signal is transmitted to a receiver. The receiver includes a demodulator for converting the received MH code signal to the RL code signal, whereby the picture corresponding to the original is formed at the receiver.

The MH code signal represents the RL information of zero through 1728 bits. More specifically, when the run length is zero through 63 bits, a specific MH code is assigned to each run length. This is referred to as the terminating code. When the run length is 64 through 1728 bits, a specific MH code is assigned to each group of 64 bits. That is, a specific MH code is determined every increment of the run length by 64 bits. This is referred to as the makeup code. The terminating code and the makeup code are combined to represents the run length up to 1728 bits. For example, the black of run length=2 is represented as "11" in the MH code. The black of run length=1728 is represented as "0000001100101" in the MH code. That is, the MH code signal has bits two through thirteen.

Accordingly, the demodulator ROM must have thirteen address input bits. Therefore, the demodulator ROM must be of the capacity of $2^{13}=8K$ words. Alternatively, it is proposed to employ a plurality of PLA's (programmable logic array) which has a large number of input bits for demodulating purposes. However, this is not practical since the PLA is every expensive as compared with ROM.

Accordingly, an object of the present invention is to provide a novel demodulator system for a facsimile system.

Another object of the present invention is to provide a demodulator system for converting a received MH code signal into an RL code signal in a receiver of a facsimile system.

Still another object of the present invention is to provide a demodulator system for converting a received MH code signal into an RL code signal, which requires an ROM of a small capacity.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In accordance with the present invention, by properly shifting the received MH code signal, the demodulator can be formed by an ROM of 2K word capacity.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
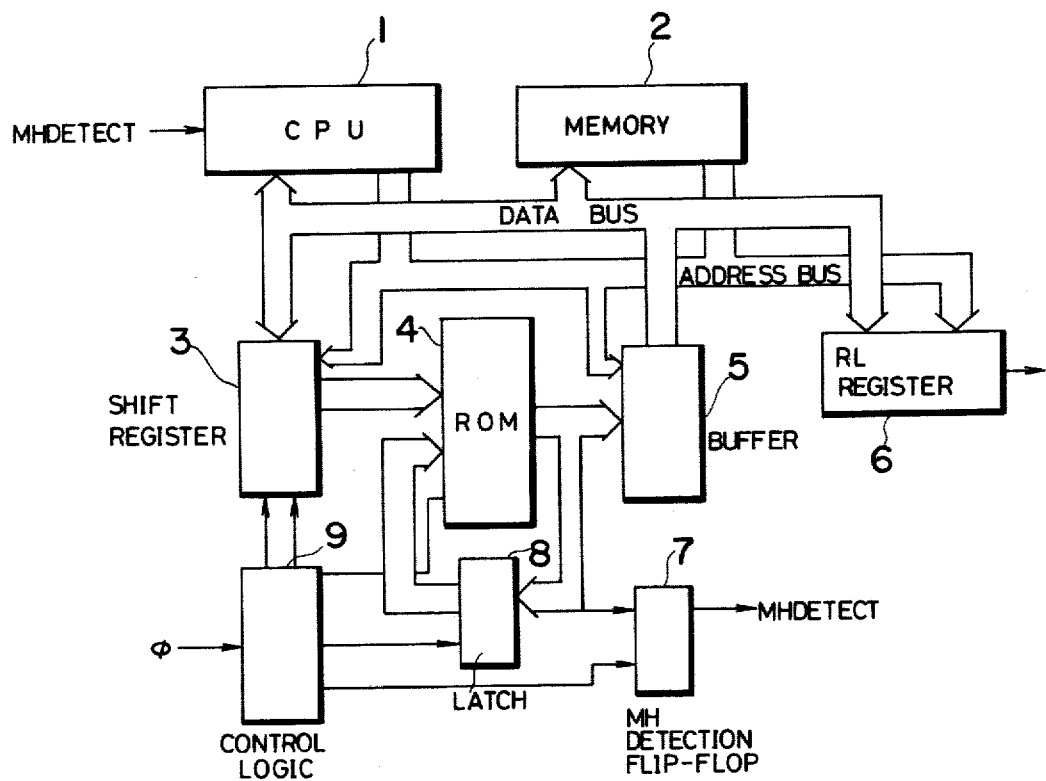
FIG. 1 is a schematic block diagram of an embodiment of a facsimile receiver of the present invention.

FIG. 1 schematically shows a facsimile receiver employing an embodiment of a demodulator system of the present invention.

The facsimile receiver mainly comprises a central processor unit (CPU) 1 for developing various control signals for controlling the operation of the facsimile receiver. A memory 2 is provided for storing a data and developing the data in accordance with the control signals derived from the CPU 1. An MH code (Modified Huffman Code) signal transmitted from a transmitter and received by the facsimile receiver is introduced into a shift register 3. When the MH code signal is introduced into the shift register 3, a control logic 9 functions to transfer the contents stored in the shift register 3 into a read only memory (ROM) 4, which contains a demodulation table, in response to a clock signal $\phi$. An MH code detection flip-flop 7 is connected to the ROM 4 for sampling a particular one bit, for example, the eighth bit of an output signal of the ROM 4 while the MH code is introduced into the ROM 4.

While the MH code is not yet detected, four bits of the output signal of the ROM 4 (fourth through seventh bits) are latched in a large circuit 8, and the thus latched data is applied to the ROM 4 at the following clock timing. When the MH code is detected, a detection signal is developed from the MH code detection flip-flop 7 for conducting the interruption on the operation of the CPU 1. Upon development of the detection signal, the CPU 1 reads out the output data from the ROM 4 via a buffer 5. In the case when the MH code is the terminating code, the data is applied directly to an RL (run length) register 6. In the case when the MH code is the makeup code, the data is modified to show the actual run length and, then, introduced into the RL register 6. The RL register 6 counts up the run length number, and develops picture information to a recorder indicative of black or white information.

The data processing operation in the demodulation table of the ROM 4 is as follows. As already discussed above, the MH code is classified into the terminating code and the makeup code. In this example, both of the terminating code and the makeup code comprise eight bits to show the run length information. The terminating code is related to the zero through 63 bit information, which can be represented by $2^6$, and, therefore, the eight bit information can be used as the run length information without modification. The run length represented by the makeup code has $2^7$ through $2^{11}$ length and, therefore, in the present system, the last six bit "zero" is omitted. Instead thereof, information "1" is inserted in the seventh bit for representing that the signal relates to the makeup information, the seventh bit being not used in the makeup code nor in the terminating code.

For example, RL=1728 is represented by the makeup code. More specifically, the run length information should be "000110110000000." In this case, the data processed in the ROM 4 is "01011011." The eighth bit is assigned to the detection bit as to whether the received signal is the MH code signal or not. The MH code information is sequentially introduced into the demodulation table by shifting the information, and the introduced information is compared with the table to determine as to whether the introduced information corresponds to any one of the MH code programmed in the demodulation table.

Before the introduced information corresponds to any one of the MH code, the data is processed in the following manner. Every MH code is represented by information less than or equal to thirteen bits. For example, the information of black of RL=1728 is represented in the MH code as follows:

"0000001100101"

The first six bits are "0". It will be clear from the MH code table that the leading "0" occupies the first four bits at the least in the case where the MH code has the maximum thirteen bits. The leading "0" occupies the first eleven bits at the maximum when the MH code represents one line completion, namely, the line synchronization code EOL (000000000001).

In this example, the ROM demodulation table has output terminals $D_0$ through $D_7$. The above-mentioned leading "0" is counted up through the use of three bit outputs $D_6$, $D_5$ and $D_4$ of the ROM. The count up operation is terminated at the moment when the information "1" first appears. As to the line synchronization code EOL, the output $D_3$ is used in addition to the three bit outputs $D_6$, $D_5$ and $D_4$ for counting the leading "0". The count operation is terminated when the count information becomes eleven, and the EOL is detected at the subsequent appearance of the information "1".

The eighth bit output $D_7$ of the ROM is assigned to the detection bit for the MH code. Until the MH code detection is conducted, the eight bit $D_7$ develops a signal of logic "1." The remaining three bit outputs $D_0$, $D_1$ and $D_2$ are redundancy bits. In this embodiment, the three bit outputs $D_0$, $D_1$ and $D_2$ are "000" while the leading "0" is counted, and used to count up the bit number after the information "1" appears at the MH code input.

The demodulator system of the present invention comprises an ROM having ten bit input terminals. The MH code input information is applied to six bit terminals, and the remaining four bit input terminals are used for feeding-back purposes through the latch circuit. Accordingly, the seventh bit and the eight bit data of the MH code is formed through the use of the data fed-back through the latch circuit in accordance with a particular program. For example, when the MH code information corresponding to black of RL=45 is introduced, the input data $A_0$ through $A_9$ and the output data $D_0$ through $D_7$ of the ROM are varied as shown in the following TABLE I until the MH code detection is performed. The mH code assigned to black of RL=45 is "000001010101."

TABLE I

| | | | | | | | | | | (Black of RL = 45) | | | | | | | | |
|---|---|---|---|---|---|---|---|---|---|---|---|---|---|---|---|---|---|---|
| $A_9$ | $A_8$ | $A_7$ | $A_6$ | $A_5$ | $A_4$ | $A_3$ | $A_2$ | $A_1$ | $A_0$ | | $D_7$ | $D_6$ | $D_5$ | $D_4$ | $D_3$ | $D_2$ | $D_1$ | $D_0$ |
| 0 | 0 | 0 | 0 | 0 | 0 | 0 | 0 | 0 | 0 | $t_1$ | 1 | 0 | 0 | 1 | 0 | 0 | 0 | 0 |
| 0 | 0 | 1 | 0 | 0 | 0 | 0 | 0 | 0 | 0 | $t_2$ | 1 | 0 | 1 | 0 | 0 | 0 | 0 | 0 |
| 0 | 1 | 0 | 0 | 0 | 0 | 0 | 0 | 0 | 0 | $t_3$ | 1 | 0 | 1 | 1 | 0 | 0 | 0 | 0 |
| 0 | 1 | 1 | 0 | 0 | 0 | 0 | 0 | 0 | 0 | $t_4$ | 1 | 1 | 0 | 0 | 0 | 0 | 0 | 0 |
| 1 | 0 | 0 | 0 | 0 | 0 | 0 | 0 | 0 | 0 | $t_5$ | 1 | 1 | 0 | 1 | 0 | 0 | 0 | 0 |
| 1 | 0 | 1 | 0 | 0 | 0 | 0 | 0 | 0 | 1 | $t_6$ | 1 | 1 | 0 | 1 | 0 | 0 | 0 | 1 |
| 1 | 0 | 1 | 0 | 0 | 0 | 0 | 0 | 1 | 0 | $t_7$ | 1 | 1 | 0 | 1 | 0 | 0 | 1 | 0 |
| 1 | 0 | 1 | 0 | 0 | 0 | 0 | 1 | 0 | 1 | $t_8$ | 1 | 1 | 0 | 1 | 0 | 0 | 1 | 1 |
| 1 | 0 | 1 | 0 | 0 | 0 | 1 | 0 | 1 | 0 | $t_9$ | 1 | 1 | 0 | 1 | 0 | 1 | 0 | 0 |
| 1 | 0 | 1 | 0 | 0 | 1 | 0 | 1 | 0 | 1 | $t_{10}$ | 1 | 1 | 0 | 1 | 0 | 1 | 0 | 1 |
| 1 | 0 | 1 | 0 | 1 | 0 | 1 | 0 | 1 | 0 | $t_{11}$ | 1 | 1 | 0 | 1 | 1 | 1 | 1 | 0 |
| 1 | 0 | 1 | 1 | 0 | 1 | 0 | 1 | 0 | 1 | $t_{12}$ | 0 | 0 | 1 | 0 | 1 | 1 | 0 | 1 |

During the time period $t_1$ through $t_5$, the MH code signal is sequentially shifted and the upper bits "0" are introduced. The leading "0" is counted and the count result is developed at the output terminals $D_6$ through $D_3$. The thus developed output signal is fed back to the input terminals $A_9$ through $A_6$, and introduced at the subsequent shift operation. The output $D_7$ bears the logic "1" since the MH code detection operation is performed. At the time $t_6$, information "1" is applied to the input terminal $A_0$. The count operation of the leading "0" is terminated, and instead thereof, the subsequent bit number is counted through the use of the outputs $D_0$ through $D_2$. Till the time $t_{11}$, the data is sequentially shifted and applied to the data input side. As already discussed above, the address input is not applied to the seventh bit and the eighth bit. Therefore, the information must be modified through the use of the data applied from the output terminals $D_6$ through $D_3$. More specifically, when the seventh bit data and the eighth bit data in the MH code are different from the contents applied from the outputs $D_6$ through $D_3$, the outputs $D_6$ through $D_3$ are modified in accordance with the program and, then, applied to the address inputs.

In the case of black of RL=45, the outputs $D_6$ through $D_3$ at the time $t_{10}$ are "1010." If the outputs "1010" are applied to the address inputs of the ROM at the time $t_{12}$, the contents for the input $A_6$ become "0," which differ from the MH code for black of RL=45, "000001010101." Therefore, in the present invention, at the time $t_{11}$, in accordance with the programmed contents, the output $D_3$ is modified to "1," and the thus modified data "1011" is fed back to the input side. In this way, the ROM detects that the applied signal is the MH code signal for the black of RL=45, and develops "101101" at the output terminals $D_6$ through $D_0$, which represents RL=45. At the moment when the above MH code is detected, the detection bit $D_7$ changes to "0."

In the case where the MH code detection is not achieved, namely, when an erroneous data is received by the facsimile receiver, the MH detection bit $D_7$ is changed to "0" at a time other than the MH code detection period, whereby a different RL is forced to be detected to release the system from the detection impossible condition.

Figure 2:
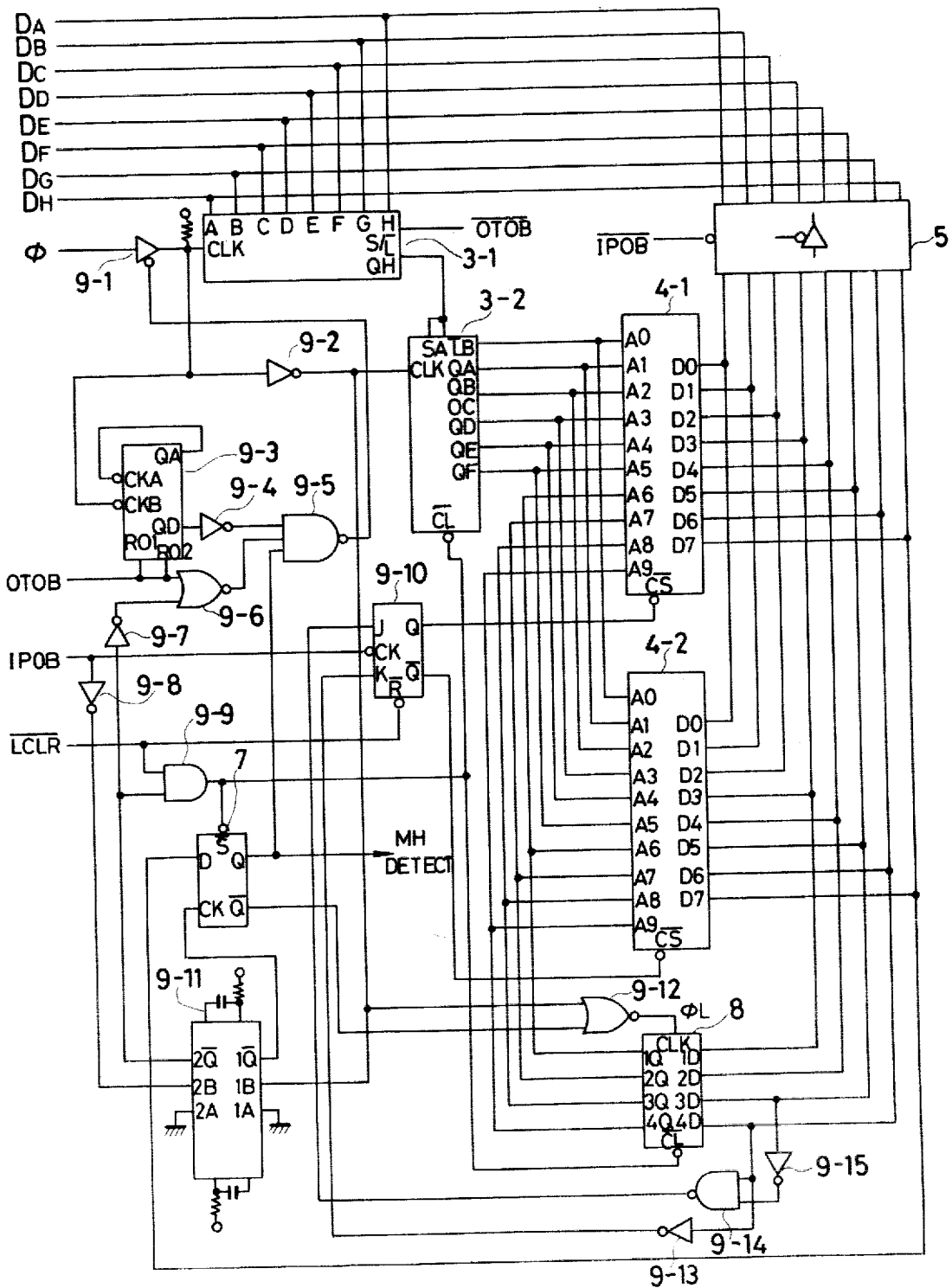
FIG. 2 is a block diagram of a demodulator system included in the facsimile receiver of FIG. 1.

The demodulator system in the facsimile receiver of FIG. 1 is shown, in detail, in FIG. 2. In this example, two 1K×8 bit ROM's are employed for the demodulation table, one being assigned to the black information, and the other being assigned to the white information. The operation of one ROM 4-1 is only discussed hereinbelow for the purpose of simplicity.

The facsimile signal transmitted from the transmitter includes a signal for indicating the initiation of one line. When the line initiation signal is detected, the CPU 1 (FIG. 1) develops a line start signal $\overline{LCLR}$ to reset the demodulator system in the facsimile receiver. The thus obtained reset signal is applied to shift registers 3-1, 3-2, the latch cicuit 8 and the two ROM's 4-1, 4-2 to clear them. The reset signal is also applied to a black/white selection flip-flop 9-10 to reset the flip-flop, whereby the black/white selection flip-flop 9-10 is placed in a condition selecting the "white". Then, the demodulating operation is initiated.

The CPU 1 functions to supply the first shift register 3-1 with eight bit MH data through data lines $D_A$ through $D_H$. More specifically, the transmitted MH data is supplied to the first shift register 3-1 eight bits by eight bits. This writing-in operation is controlled by a write-in signal OTOB which is applied to the first shift register 3-1. The write-in signal OTOB is also applied to reset terminals $R_{01}$ and $R_{02}$ of an eight bit counter 9-3. The eight bit counter 9-3 is held in the reset state during the writing-in operation. The eight bit counter 9-3 is released from the reset state when the writing-in operation is completed to turn on a clock gate 9-1 through gates 9-4 and 9-5, whereby the clock $\phi$ is introduced into the eight bit counter 9-3 for counting purposes. The counting operation in the eight bit counter 9-3 is controlled by the on/off operation of the gate 9-1. The gate 9-1 is turned off either by a signal applied from the flip-flop 7 through the gate 9-5, the signal being developed when the MH code detection is achieved, or by a QH signal applied through the gates 9-4 and 9-5, the QH signal being developed with eight bit count is completed.

While the clock $\phi$ is counted by the eight bit counter 9-3, the data stored in the first shift register 3-1 is shifted in response to the clock $\phi$ and transferred to the second shift register 3-2 from an output terminal QH in response to a clock pulse $\overline{\phi}$. The second shift register 3-2 includes six bit parallel outputs $Q_A$ through $Q_F$, which are applied to the lower six bit inputs $A_0$ through $A_5$ of the ROM's 4-1 and 4-2. The ROM's 4-1 and 4-2 are alternatively enabled in accordance with the output signal derived from the black/white selection flip-flop 9-10. The eighth bit output $D_7$ of the ROM's 4-1 and 4-2 is applied to the MH detection flip-flop 7 and sampled in response to an MH detection clock developed from an output terminal 1Q of a mono-stable multivibrator 9-11. The Q output of the MH detection flip-flop 7 functions as a timing signal for effecting the interruption to the CPU 1, whereby the contents stored in the ROM are applied to the RL register (6) when the MH code is written into the ROM.

While the MH code information is sequentially shifted and introduced into the ROM and when the MH detection is not yet achieved, the latch circuit 8 latches the four bit outputs $D_6$ through $D_3$ of the ROM in response to a latch clock $\phi_L$. The thus latched contents are applied to the address inputs $A_6$ through $A_9$ of the ROM at the subsequent clock $\overline{\phi}$. The data shift to the ROM is repeated in response to the clock signal until the introduced data becomes identical with any one of programmed MH codes. When the address input information becomes identical with any one of the MH codes, the detection output is developed at the eighth output terminal $D_7$ to perform the interruption of the CPU 1.

When the interruption command is applied to the CPU 1, the CPU 1 develops a read-out signal IPOB to turn on the buffer 5, thereby reading out the contents stored in the ROM 4-1 or 4-2. If the read out MH code is the terminating code, the run length can be represented by six bits and, therefore, the ROM contents are applied to the RL register 6 without modification. If the read out MH code is the makeup code, the ROM outputs are modified to obtain the actual run length information. More specifically, the seventh bit "1" of the read out RL information is reset, and the information "0" is added to the last six bits. The thus obtained actual run length information is transferred to the RL register 6.

The read-out signal IPOB is also applied to the monostable multivibrator 9-11 for detecting the trailing edge of the read-out signal IPOB. An output $\overline{2Q}$ is applied to the second shift register 3-2, the latch circuit 8 and the flip-flop 7 to clear them. The read-out signal IPOB is further applied to the black/white selection flip-flop 9-10 to control the selection of the two ROM's 4-1 and 4-2.

In the case where the RL information read out from the ROM is the makeup code, the terminating code subsequently appears. If the makeup code represents the black information, the subsequent terminating code also represents the black information. In this case, the seventh and sixth bit outputs $D_6$ and $D_5$ are "10" and, therefore, information "00" is applied to the black/white selection flop-flop 9-10 through gates 9-13, 9-14 and 9-15. The black/white selection flip-flop 9-10 is not reversed and, therefore, the Q output is not changed to introduce the subsequent MH code information into the same ROM. In the case where the terminating code is read out, the black/white selection flip-flop 9-10 receives an input signal "11" and, therefore, the Q output is reversed. That is, the ROM 4-1 and the ROM 4-2 are alternatively selected upon every read out operation of the terminating code.

In the foregoing embodiment the two 1K word ROM's are employed. However, one 2K word ROM can be employed without varying the circuit construction.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A demodulator system for a facsimile receiver comprising:
   a programmed demodulation table for converting received MH code (Modified Huffman Code) information into run length information;
   input means for sequentially shifting said received MH code information and applying an input data to said programmed demodulation table;

feed-back means for feeding back a portion of an output data from said programmed demodulation table to said programmed demodulation table as a portion of the input data thereto until said input data corresponds to any one of MH codes programmed in said programmed demodulation table; and output means for forming run length information through the use of the output data derived from said programmed demodulation table when the input data applied to said programmed demodulation table becomes identical with any one of MH codes programmed in said programmed demodulation table.

2. The demodulator system of claim 1, further comprising:

counter means for counting a leading "0" included in the received MH code information; and transfer means for applying contents stored in said counter means to said programmed demodulation table, thereby obtaining said portion of the output data for feed-back purposes.

3. The demodulator system of claim 1 or 2, wherein said programmed demodulation table comprises a read only memory having eight bit output terminals.

4. The demodulator system of claim 3 further comprising detection means for detecting whether the received MH code information relates to terminating code information or makeup code information.

5. The demodulator system of claim 4, wherein said output means forms the run length information without modifying the output data derived from said programmed demodulation table when said detection means indicates that the received MH code information relates to the terminating code information, and said output means forms the run length information by adding six lower bit zero's to the output data derived from said programmed demodulation table when said detection means indicates that the received MH code information relates to the makeup coded information.

* * * * *